US012620245B2

(12) United States Patent　　(10) Patent No.:　US 12,620,245 B2
Seto　　(45) Date of Patent:　　　May 5, 2026

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Hidekazu Seto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 722 days.

(21) Appl. No.: 17/837,657

(22) Filed: Jun. 10, 2022

(65) Prior Publication Data

US 2022/0406081 A1　　Dec. 22, 2022

(30) Foreign Application Priority Data

Jun. 16, 2021　(JP) ................................. 2021-100216

(51) Int. Cl.
*G06V 30/12*　　　(2022.01)
*G06V 30/19*　　　(2022.01)
(52) U.S. Cl.
CPC ...... *G06V 30/133* (2022.01); *G06V 30/19147* (2022.01); *G06V 30/19167* (2022.01)
(58) Field of Classification Search
CPC ........... G06V 30/133; G06V 30/19147; G06V 30/19167
USPC ........................................................ 382/176
See application file for complete search history.

(56) References Cited

U.S. PATENT DOCUMENTS

2020/0320325 A1　10/2020　Okuma ............ G06V 30/19147
2021/0234975 A1　　7/2021　Okuma ......... G06T 2207/20081

FOREIGN PATENT DOCUMENTS

| CN | 101267493 | A | * | 9/2008 | ......... G06V 30/1478 |
| JP | H1131194 | A | * | 2/1999 | |
| JP | 18678597 | A | * | 7/1999 | |
| JP | 2007057952 | A | * | 3/2007 | ......... G03G 21/1647 |
| JP | 2008-219825 | | | 9/2008 | |
| JP | 2008219825 | A | * | 9/2008 | |

OTHER PUBLICATIONS

U.S. Appl. No. 17/837,523, filed: Jun. 10, 2022.
U.S. Appl. No. 17/837,564, filed: Jun. 10, 2022.

* cited by examiner

*Primary Examiner* — Wednel Cadeau
(74) *Attorney, Agent, or Firm* — Venable LLP

(57)　　　　　ABSTRACT

A training image in accordance with a way a hane occurs, which is found in actual handwriting, is generated. Among line segments constituting a handwritten character in a character image representing the handwritten character, a line segment at which a handwritten hane may occur is detected. Then, by performing processing to add a simulated hane to the end portion of the detected line segment, a training image is generated.

18 Claims, 13 Drawing Sheets

| Cut-out image | Number of connected pixel groups | Number of connected pixels |
|---|---|---|
| 901 | 1<br>1<br>1 | 3<br>3<br>3 |
| 902 | 2<br>1<br>1 | 4,7<br>12<br>4 |
| 903 | 1<br>1<br>1 | 4<br>4<br>32 |
| 904 | 1<br>1<br>1 | 4<br>4<br>11 |

FIG.9

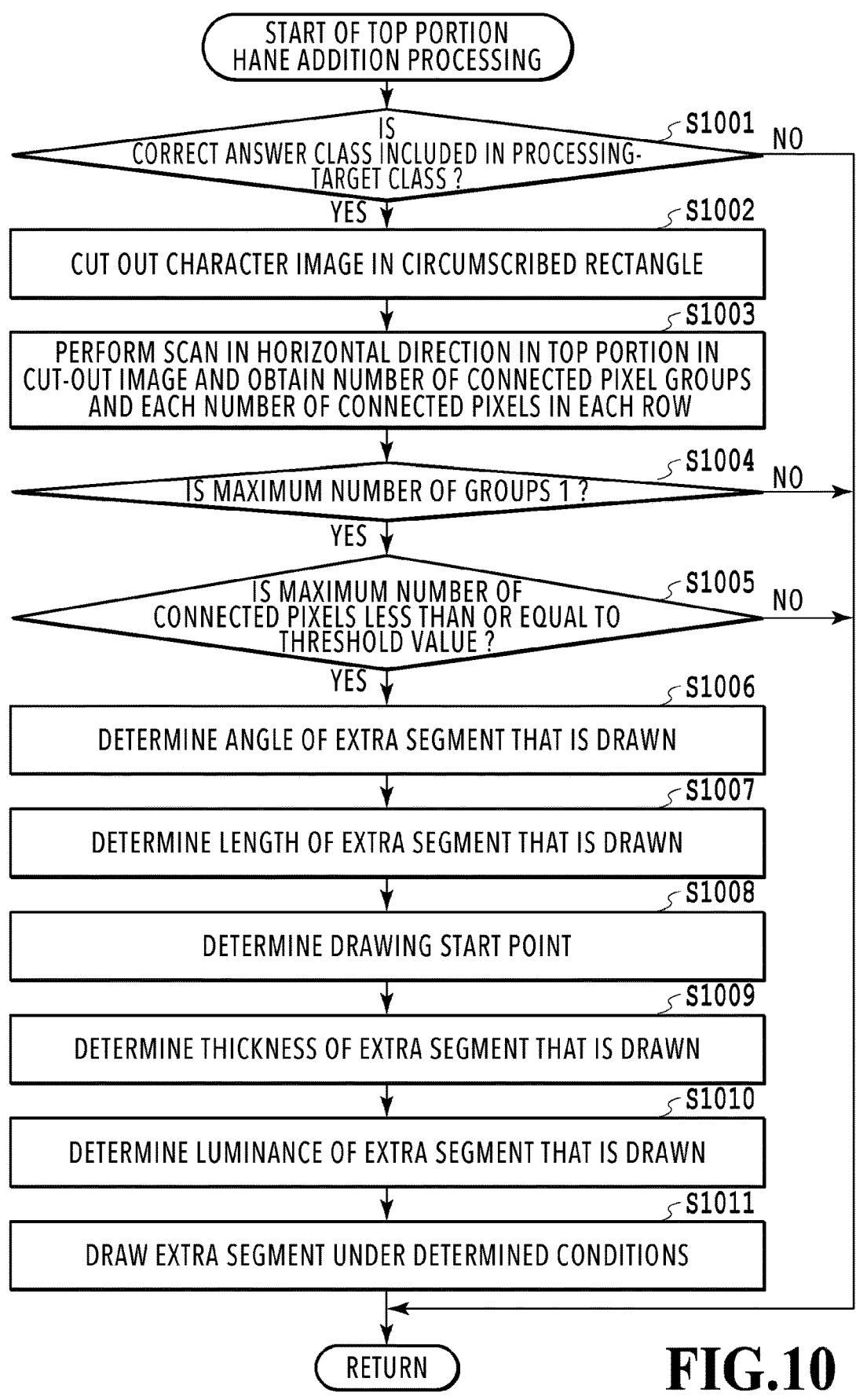

START OF TOP PORTION
HANE ADDITION PROCESSING

IS
CORRECT ANSWER CLASS INCLUDED IN PROCESSING-
TARGET CLASS ?
S1001 NO

YES

CUT OUT CHARACTER IMAGE IN CIRCUMSCRIBED RECTANGLE
S1002

PERFORM SCAN IN HORIZONTAL DIRECTION IN TOP PORTION IN
CUT-OUT IMAGE AND OBTAIN NUMBER OF CONNECTED PIXEL GROUPS
AND EACH NUMBER OF CONNECTED PIXELS IN EACH ROW
S1003

IS MAXIMUM NUMBER OF GROUPS 1 ?
S1004 NO

YES

IS MAXIMUM NUMBER OF
CONNECTED PIXELS LESS THAN OR EQUAL TO
THRESHOLD VALUE ?
S1005 NO

YES

DETERMINE ANGLE OF EXTRA SEGMENT THAT IS DRAWN
S1006

DETERMINE LENGTH OF EXTRA SEGMENT THAT IS DRAWN
S1007

DETERMINE DRAWING START POINT
S1008

DETERMINE THICKNESS OF EXTRA SEGMENT THAT IS DRAWN
S1009

DETERMINE LUMINANCE OF EXTRA SEGMENT THAT IS DRAWN
S1010

DRAW EXTRA SEGMENT UNDER DETERMINED CONDITIONS
S1011

RETURN

FIG.10

NUMBER OF
CONNECTED        ▼ ▼ ▼
PIXEL GROUPS     1 1 1

NUMBER 0
CONNECTED        4 4 5
PIXELS

ADD HANE

IMAGE PROCESSING APPARATUS, IMAGE PROCESSING METHOD, AND STORAGE MEDIUM

BACKGROUND

Field

The present invention relates to a technique to generate training data.

Description of the Related Art

In recent years, due to the change in working environment accompanying the spread of computers, the chances that a business document is scanned and computerized are increasing in number. In the computerization-target documents, a document to which a handwritten character is input, for example, such as a receipt, exists and in order to utilize computerized documents for data analysis, such as aggregation, character data is extracted by performing optical character recognition (OCR) for a handwritten character area. Here, as one of the OCR techniques that cope with handwritten characters, there is a method that uses a trained model obtained by performing machine learning, such as a neural network. In this method, first, training is performed by using training data (also called teacher data) that pairs a character image in which a handwritten character is drawn and a correct answer class obtained by converting a character included in the character image into text. Then, by inputting the character image including handwritten characters to the trained model, it is made possible to utilize the handwritten character in the scanned document as text information.

In general, in order to perform image recognition by machine learning, a large number of images is necessary as training data, but various shapes exist as handwritten characters and it is difficult to comprehensively collect images of handwritten characters in all patterns. Consequently, data augmentation of training data is performed generally by performing deformation processing, such as rotation and enlargement/reduction, for the character image for the prepared training data. Then, as an example of deformation processing, a technique has been proposed, which adds an extra segment (segment that is not necessary but added unintentionally to the last line segment of a character, for example, as shown in FIG. 13, and hereinafter, referred to as "bane" (Japanese)) to a line segment constituting a character within a character image (Japanese Patent Laid-Open No. 2008-219825).

In Japanese Patent Laid-Open No. 2008-219825 described above, as to the method of adding a hane, there is only a description, such as "the line segment is extracted and an ornament, such as a hane, is provided at the tip portion of the line segment" and details of in which case a hane is added and what kind of hane is added are not disclosed. There are many line segments constituting characters within a character image and in a case where an inappropriate hane is added, the character image becomes an image representing a handwritten character quite different from actual handwriting. In a case where many a character image such as this is generated, it is no longer possible to achieve the original object and the training accuracy is reduced on the contrary. Further, depending on the position and shape of the added bane, there is a case where the character changes to a character that can be read differently by a person. For example, in the example in FIG. 13, as a result of adding a bane surrounded by a broken-line frame to the bottom portion of the figure "2", it can be read as the figure "3". Using the character image such as this as a correct answer image adversely affects the training as in a case where training data to which a wrong correct answer class is attached is used.

An image processing apparatus according to the technique of the present disclosure is an image processing apparatus including: a memory that stores a program; and a processor that executes the program to perform: obtaining a character image representing a handwritten character; detecting a line segment at which an extra segment may occur in handwriting among line segments constituting the handwritten character in the character image; adding a simulated extra segment to the end portion of the detected line segment; and generating training data for machine learning by associating the character image in which the simulated extra segment has been added and a correct answer class with each other.

Further features of the present disclosure will become apparent from the following description of exemplary embodiments with reference to the attached drawings.

BRIEF DESCRIPTION OF THE DRAWINGS

FIG. 9 is a diagram showing a number of connected pixel groups and a number of connected pixels;

FIG. 10 is a flowchart showing details of top portion hane addition processing;

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

First Embodiment

<Outline of Image Processing System>

Figure 1:
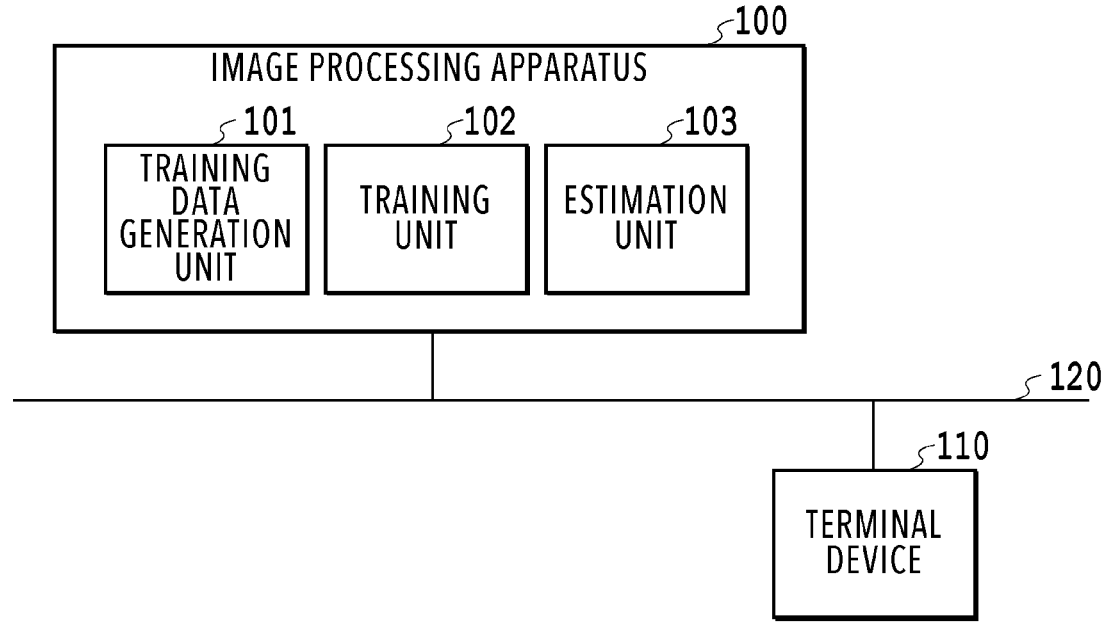
FIG. 1 a diagram showing an example of a configuration of an image processing system.

FIG. 1 a diagram showing an example of the configuration of an image processing system according to the present embodiment. As shown in FIG. 1, the image processing system includes an image processing apparatus 100 and a terminal device 110 and the image processing apparatus 100 and the terminal device 110 are connected to each other via a network 120.

The image processing apparatus 100 has each function unit of a training data generation unit 101, a training unit 102, and an estimation unit 103. The training data generation unit 101 generates training data for the training unit 102 to perform training of a model of a neural network. The training data is data that pairs a character image in which a handwritten character is drawn and a correct answer class obtained by converting a handwritten character included in the character image into text. Details of the training data that is generated in the training data generation unit 101 will be described later by using FIG. 4.

The training unit 102 performs training of a model of a neural network by using the training data generated by the training data generation unit 101. The model of a neural network that is generated by the training unit 102 is referred to as a "trained model". The training processing by the training unit 102 will be described later by using FIG. 5A. The estimation unit 103 outputs class information to the input character image by estimation using a trained model generated by the training unit 102. The estimation processing by the estimation unit 103 will be descried later by using FIG. 5B.

The terminal device 110 is, for example, an information processing apparatus, such as a PC and a smartphone. It is possible for a user or a system administrator to access the image processing apparatus 100 from the terminal device 110 via the network 120 and check instructions to perform training and the trained model.

The network 120 is a LAN, a public line (WAN) or the like, which connects the image processing apparatus 100 and the terminal device 110 and transmission and reception of data are performed between the image processing apparatus 100 and the terminal device 110 via the network 120.

The above-described system configuration is an example and only the functions necessary for the explanation in the present embodiment are shown schematically. Each apparatus or device may have any logic configuration as long as the configuration is capable of implementing the technique that is disclosed in the present embodiment. For example, in the configuration shown in FIG. 1, the estimation unit 103 is incorporated in the image processing apparatus 100, but it may also be possible for another apparatus separate from the image processing apparatus 100 to have the estimation unit 103.

<Hardware Configuration>

Figure 2A:
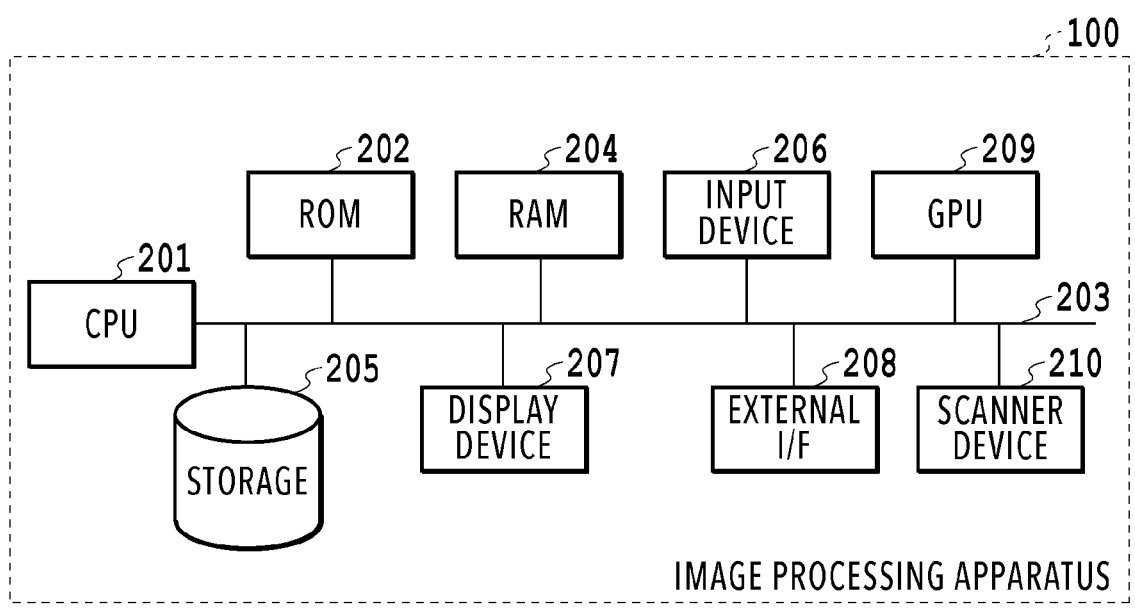
FIG. 2A is a block diagram showing an example of a hardware configuration of an image processing apparatus and FIG. 2B is a block diagram showing an example of a hardware configuration of a terminal device.
Figure 2B:
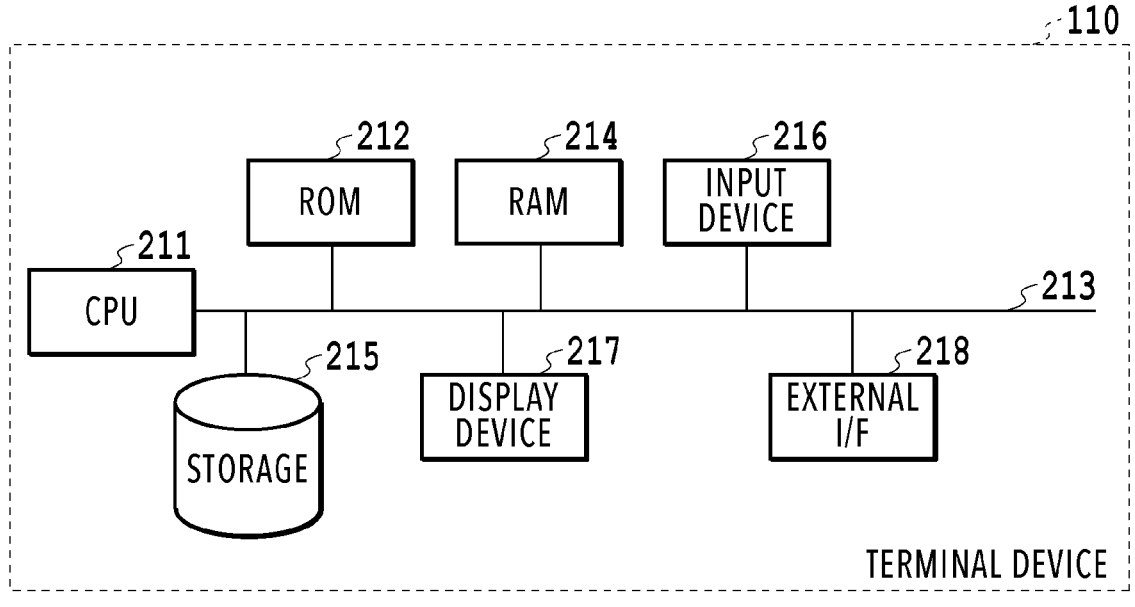

FIG. 2A and FIG. 2B are block diagrams showing examples of the hardware configuration of the image processing apparatus 100 and that of the terminal device 110, respectively, in the image processing system shown in FIG. 1.

FIG. 2A is a diagram showing the hardware configuration of the image processing apparatus 100. As shown in FIG. 2A, the image processing apparatus 100 includes a CPU 201, a ROM 202, a RAM 204, a storage 205, an input device 206, a display device 207, an external I/F 208, and a GPU 209 and each unit is connected to one another via a data bus 203.

The CPU 201 is a control device for controlling the entire operation in the image processing apparatus 100. The CPU 201 activates the system of the image processing apparatus 100 by executing a boot program stored in the ROM 202 and executes programs stored in the storage 205. Further, the CPU 201 performs part of the calculation processing that is performed by the training data generation unit 101 and the training unit 102 in cooperation with the GPU 209. The ROM 202 is implemented by a nonvolatile memory and is a storage device that stores the boot program that activates the image processing apparatus 100, and the like. The data bus 203 is a communication path for performing transmission and reception of data between the devices constituting the image processing apparatus 100. The RAM 204 is implemented by a volatile memory and is a storage device that is used as a work memory at the time of the CPU 201 executing programs. The storage 205 is implemented by an HDD (Hard Disk Drive), an SSD (Solid State Drive) and the like and is a large-capacity storage device for storing programs and training data. The programs here include programs for instructing the CPU 201 to perform training data generation processing, training processing, and estimation processing, to be described later. By the CPU 201 executing these programs, the training data generation unit 101, the training unit 102, and the estimation unit 103 described previously are implemented. The input device 206 is implemented by a mouse, a keyboard and the like and receives an operation input to the image processing apparatus 100 from an engineer. The display device 207 is implemented by a liquid crystal display and the like and displays and outputs various setting screens and the like of the image processing apparatus 100 to an engineer. The external I/F 208 is an interface for performing transmission and reception of various kinds of data, commands and the like with the terminal device 110 via the network 120. The GPU 209 is a computing device specialized in image processing. The GPU 209 performs computing and the like for updating parameters constituting a training model based on given training data under the control by the CPU 201. A scanner device 210 is a device that scans a document, such as a business form, by using a CCD or the like and generates image data by converting obtained electric signal data.

FIG. 2B is a diagram showing the hardware configuration of the terminal device 110. As shown in FIG. 2B, the terminal device 110 includes a CPU 211, a ROM 212, a RAM 214, a storage 215, an input device 216, a display device 217, and an external I/F 218 and each is connected to one another via a data bus 213. The CPU 211 is a control device for controlling the entire operation in the terminal device 110. The CPU 211 activates the system of the terminal device 110 by executing the boot program stored in the ROM 212 and executes programs stored in the storage 215. The ROM 212 is implemented by a nonvolatile memory and is a storage device that stores the boot program that activates the terminal device 110, and the like. The data bus 213 is a communication path for performing transmission and reception of data between the devices constituting the terminal device 110. The RAM 214 is implemented by a volatile memory and is a storage device that is used as a work memory at the time of the CPU 211 executing image processing programs. The storage 215 is implemented by an HDD (Hard Disk Drive), an SSD (Solid State Device) or the like and is a storage device for storing the programs and the like described previously. The input device 216 is implemented by a mouse, a keyboard and the like and receives an operation input to the terminal device 110 from a user. The display device 217 is implemented by a liquid crystal display and the like and displays and outputs various kinds of information to a user. The external I/F 218 is an interface for performing transmission and reception of various kinds of data, commands and the like with the image processing apparatus 100 via the network 120.

<About Training Data>

Next, training data that is a pair of a character image and a correct answer class, which is used for training of a neural network, is explained. Here, the terms are defined. An image obtained by cutting out a handwritten character area of each individual character from a scanned image of an actually handwritten document is called a "character image". Then, an image obtained by the training data generation unit 101 performing deformation processing for the character image is called a "training image".

<<Character Image Database>>

Figure 3:
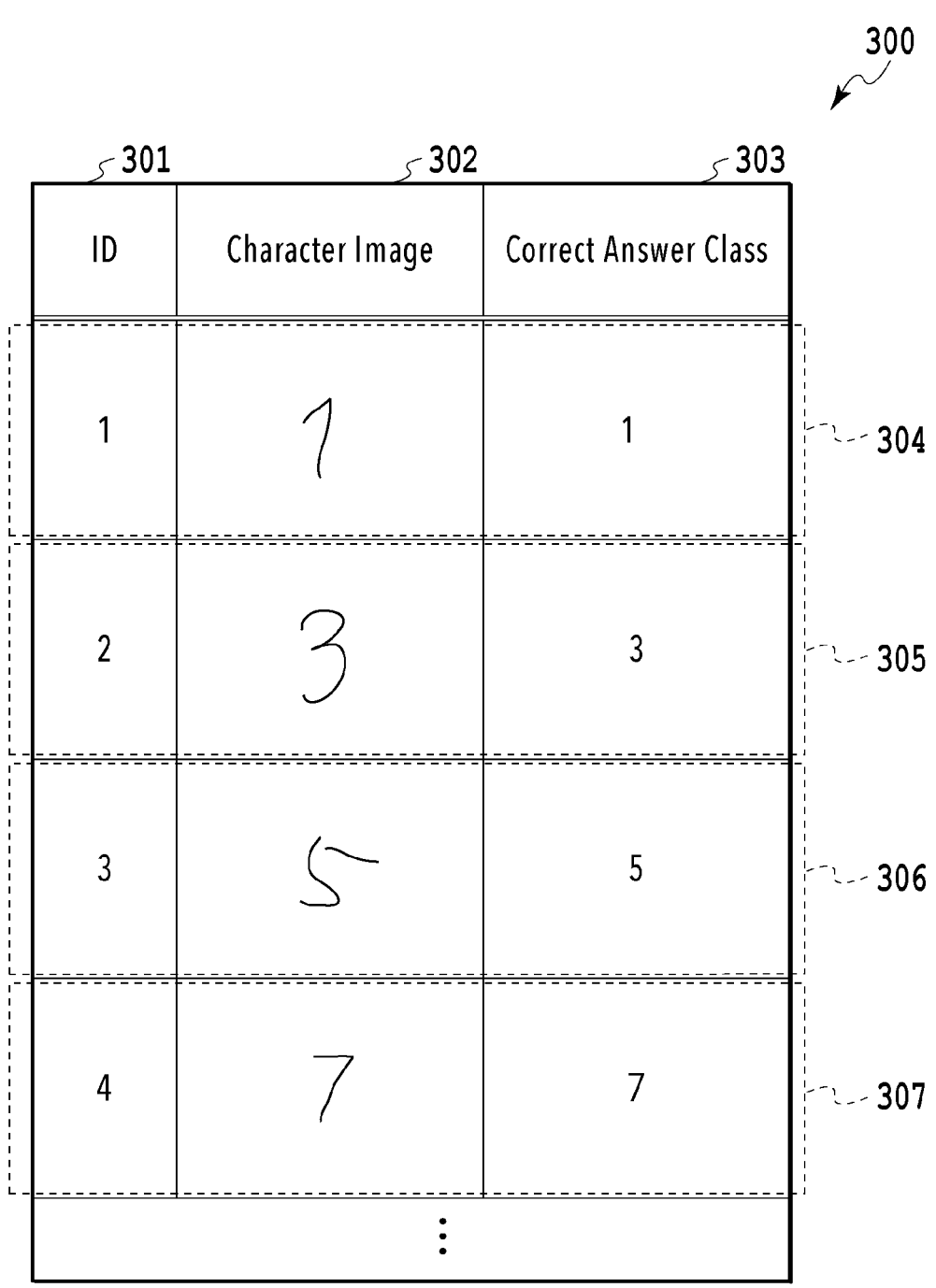
FIG. 3 is a diagram showing an example of a table as a character image DB.

FIG. 3 is a diagram showing an example of a table as a database (in the following, described as "character image DB") for storing character images. In a table 300 as the character image DB, data or a value corresponding to each item of "Record ID" 301, "Character Image" 302, and "Correct Answer Class" 303 is stored. It is assumed that to the character image DB, part of the storage area of the storage 205 is allocated dedicatedly "Record ID" 301 is a field to which identification information for uniquely identifying each record within the table 300 is input. This record ID is attached to a record each time the record is added to the table 300. "Character Image" 302 is a field to which image data corresponding to each handwritten character is input. "Correct Answer Class" 303 is a field in which a handwritten character included within the character image is stored as text data. Here, in the table 300 shown in FIG. 3, four records 304 to 307 associating the character image of a handwritten figure and the correct answer class thereof each other are illustrated.

As described previously, each character image that is stored in the table 300 is obtained by cutting out only the handwritten character portion for each character from an image obtained by scanning a document and the like including handwritten characters, but the obtaining method of a character image is not limited to this. Further, instead of comprehensively managing a plurality of character images as in the table 300 shown in FIG. 3, for example, it may also be possible to perform management by providing a table for each correct answer class.

<<Training Image Database>>

Figure 4:
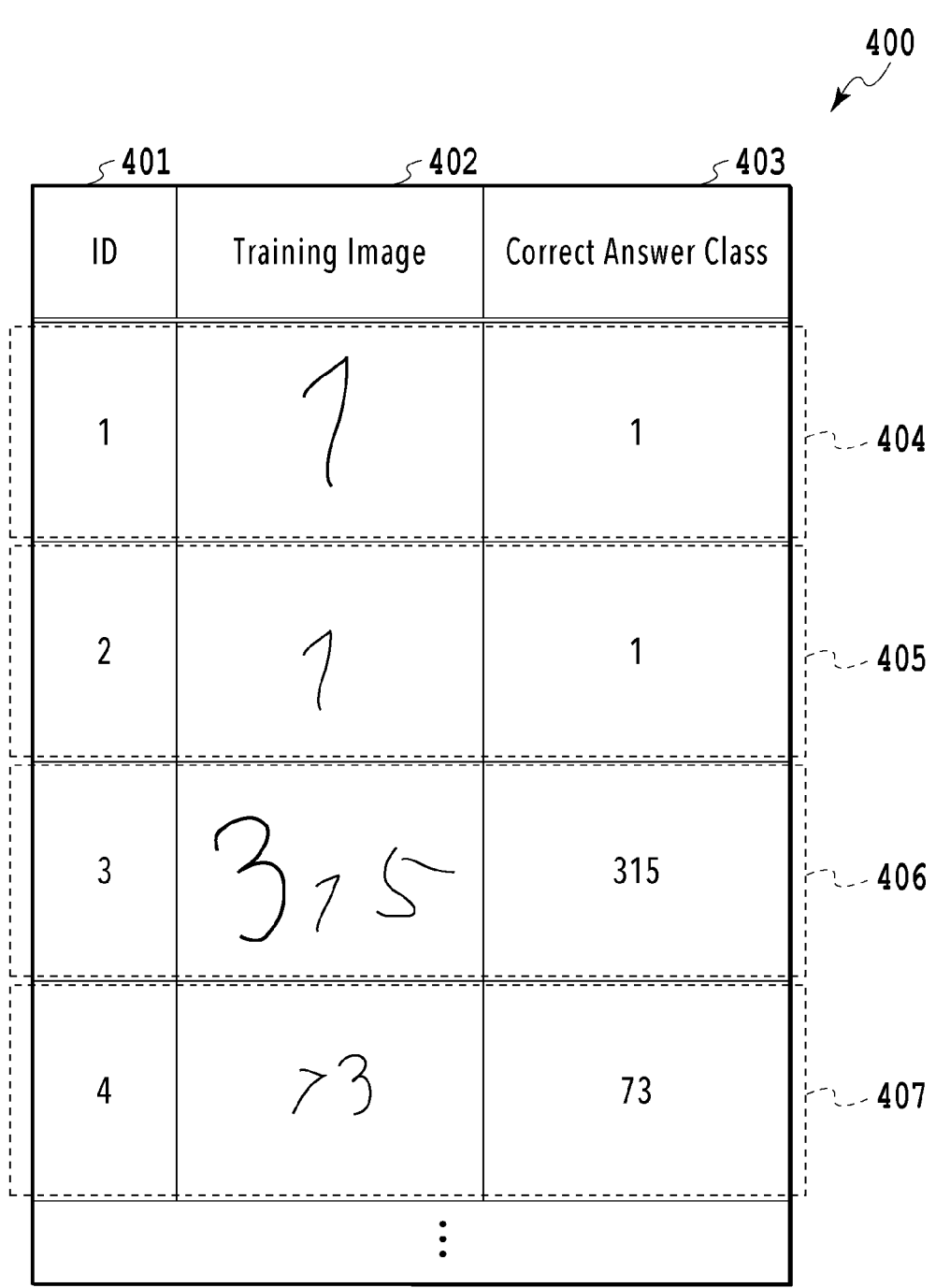
FIG. 4 is a diagram showing an example of a table as a training image DB.

Next, the training image used for training of a neural network is explained, which is generated by the training data generation unit 101 performing deformation processing for the character image stored in the character image DB described above. FIG. 4 is a diagram showing an example of a table as a database (in the following, described as "training image DB") for storing training images generated by the training data generation unit 101. In a table 400 as the training image DB, data or a value corresponding to each item of "Record ID" 401, "Training Image" 402, and "Correct Answer Class" 403 is stored. It is assumed that to the training image DB, part of the storage area of the storage 205 is allocated dedicatedly.

"Record ID" 401 is a field to which identification information for uniquely identifying each record within the table 400 is input. The value in this "Record ID" 401 is attached to a record each time the record is added to the table 400. "Training Image" 402 is a field in which image data is generated by deforming a character image, and so on, is stored. "Correct Answer Class" 403 is a field in which a character included within the training image is stored as text data.

Here, in the table 400 shown in FIG. 4, four records 404 to 407 associating the training image obtained by performing deformation processing for each character image in the records 304 to 307 in the table 300 in FIG. 3 and the correct answer class thereof each other are shown. In the specific example shown in the table 400 in FIG. 4, the number of characters included in one training image is one to three, but it may be possible to arbitrarily set the upper limit thereof. For example, it may also be possible to adopt a configuration in which the upper limit is set to 15 characters and a training image is generated, which consists of an arbitrary number of characters, by rearranging the character images within the range thereof, or adopt a configuration in which the upper limit is set to one character and a training image is generated by only a character image including one character.

<Training Processing>

Figures 5A, 5B:
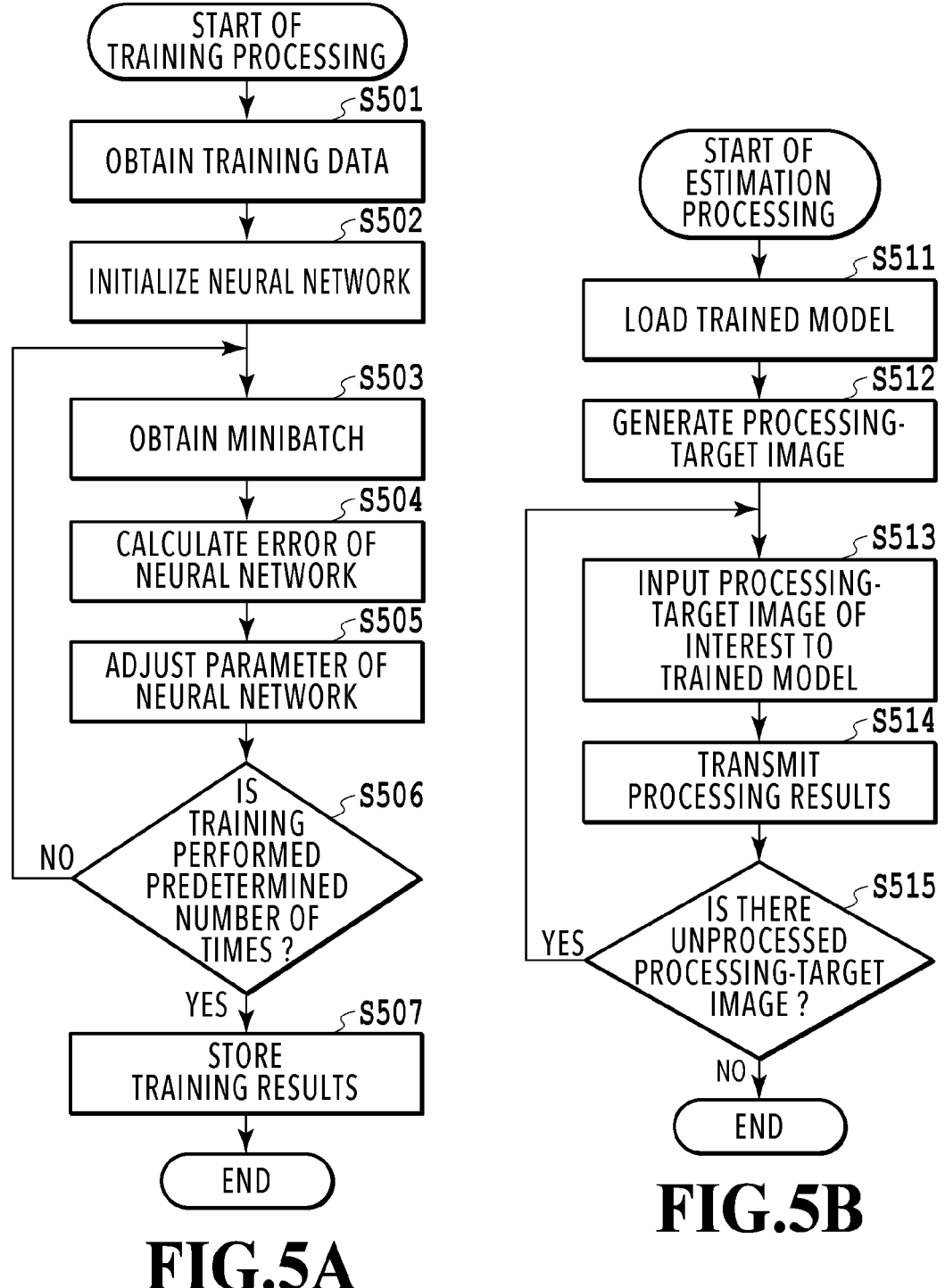
FIG. 5A is a flowchart showing a flow of training processing and FIG. 5B is a flowchart showing a flow of estimation processing.

Next, the training processing by the training unit 102 is explained by using FIG. 5A. FIG. 5A is a flowchart showing a flow of the training processing. Each step shown in the flowchart in FIG. 5A is implemented by the CPU 201 loading a predetermined program stored in the ROM 202 or the like onto the RAM 204 and executing the program. The training processing is started in response to a predetermine operation of a user via the input device 206 of the image processing apparatus 100, or triggered by a predetermine input signal received from the terminal device 110 or the like via the network 120. In the present embodiment, it is assumed that for the training of a neural network, the minibatch method is used. In the following explanation, symbol "S" means a step.

At S501, from the training image DB, a dataset of the training data necessary for training is obtained. Specifically, with reference to each record included in the table 400 as the training image DB, the training data that is a pair of a training image and a correct answer class is obtained.

At S502, a neural network is initialized. Specifically, a neural network is constructed and a value of a parameter included in the neural network is determined randomly. It is possible to use a variety of structures as the neural network that is constructed. For example, it may also be possible to adopt an aspect, such as a CNN (Convolutional Neural Networks).

At S503, a predetermined number (minibatch size, for example ten. In a case where the training aspect of minibatch is not adopted, one) of pieces of training data among the training data read at S501 is obtained. Then, at S504 and S505, training of the neural network is performed.

At S504, an error of the neural network is calculated. Specifically, processing to find an error by inputting a training image that is included in each piece of training data within the minibatch obtained at S503 to the neural network, outputting class information representing a character within the training image, and evaluating a difference between the output and the correct answer class is performed. For the evaluation, it is possible to use CTC (Connectionist Temporal Classification) Loss or the like as an index.

At S505, the parameter of the neural network is adjusted. Specifically, based on the error calculated at S504, processing to change the parameter of the neural network is performed by, for example, the backpropagation method.

At S506, whether or not to terminate the training is determined. Specifically, whether or not the processing at S503 to S505 is performed a predetermined number of times (for example, 40,000 times) is checked. Here, it is sufficient to determine the predetermined number of times by, for example, a user inputting a desired number of times at the time of starting training processing. In a case where the processing is performed the predetermined number of times, it is determined that the training is completed and the processing makes a transition to S507. In a case where the processing is not performed the predetermined number of times, the processing returns to S503 and the training of the neural network is continued.

At S507, a trained model including the parameter of the neural network, which has been adjusted at S505, is stored in the storage 205 as the training results.

The above is the contents of the training processing. In the flowchart in FIG. 5A, in the training data obtaining processing (S501), processing is performed so that the training data generated in advance is read, but it may also be possible to perform the generation processing of training data and the training processing in parallel. That is, the configuration may be one in which the training data generation processing, to be described later, is performed prior to the training data obtaining processing (S501) and the training data is obtained by sequential reading from the generated training data.

<Estimation Processing>

Next, the estimation processing by the estimation unit 103 is explained by using FIG. 5B. FIG. 5B is a flowchart showing a flow of the estimation processing. Each step shown in the flowchart in FIG. 5B is implemented by the CPU 201 loading a predetermined program stored in the ROM 202 or the like onto the RAM 204 and executing the program. The estimation processing is started in response to a predetermined operation of a user via the input device 206 of the image processing apparatus 100, or triggered by a predetermined input signal received from the terminal device 110 and the like via the network 120. In the following explanation, symbol "S" means a step.

At S511, the trained model is read. Specifically, first, a neural network having the same structure as that of the neural network constructed at S502 in the flowchart in FIG. 5A described previously is constructed and in the constructed neural network, the trained model stored at S507 described previously is reflected.

At S512, processing to generate an estimation processing-target image (in the following, called "processing-target image") is performed. Specifically, from a scanned image obtained by scanning a document, such as a receipt, pixels corresponding to a handwritten character are extracted, the circumscribed rectangle of the extracted pixel block is found, and an image including pixels with the circumscribed rectangle is obtained. This processing is generally called "block selection" and the image obtained by this is called a "character block". In this manner, from a scanned image of a receipt or the like, one or a plurality of processing-target images is generated.

At S513, a processing-target image of interest among the processing-target images generated at S512 is input to the trained model. Due to this, text information corresponding to the character included in the processing-target image of interest is output as estimation results.

At S514, the estimation results obtained at S513 are transmitted. In the present embodiment, the estimation results are transmitted to the terminal device 110 via the network 120. It may also be possible to adopt a configuration in which the estimation results are stored in the storage 205 instead of transmitting the estimation results to the terminal device 110.

At S515, whether or not to terminate the estimation processing is determined. In a case where the estimation processing is completed for all the processing-target images generated at S512, this processing is terminated. On the other hand, in a case where an unprocessed processing-target image remains, the processing returns to S513, and the next processing-target image of interest is input to the trained model and the estimation processing is continued.

The above is the contents of the estimation processing.

<Training Data Generation Processing>

Figure 6:
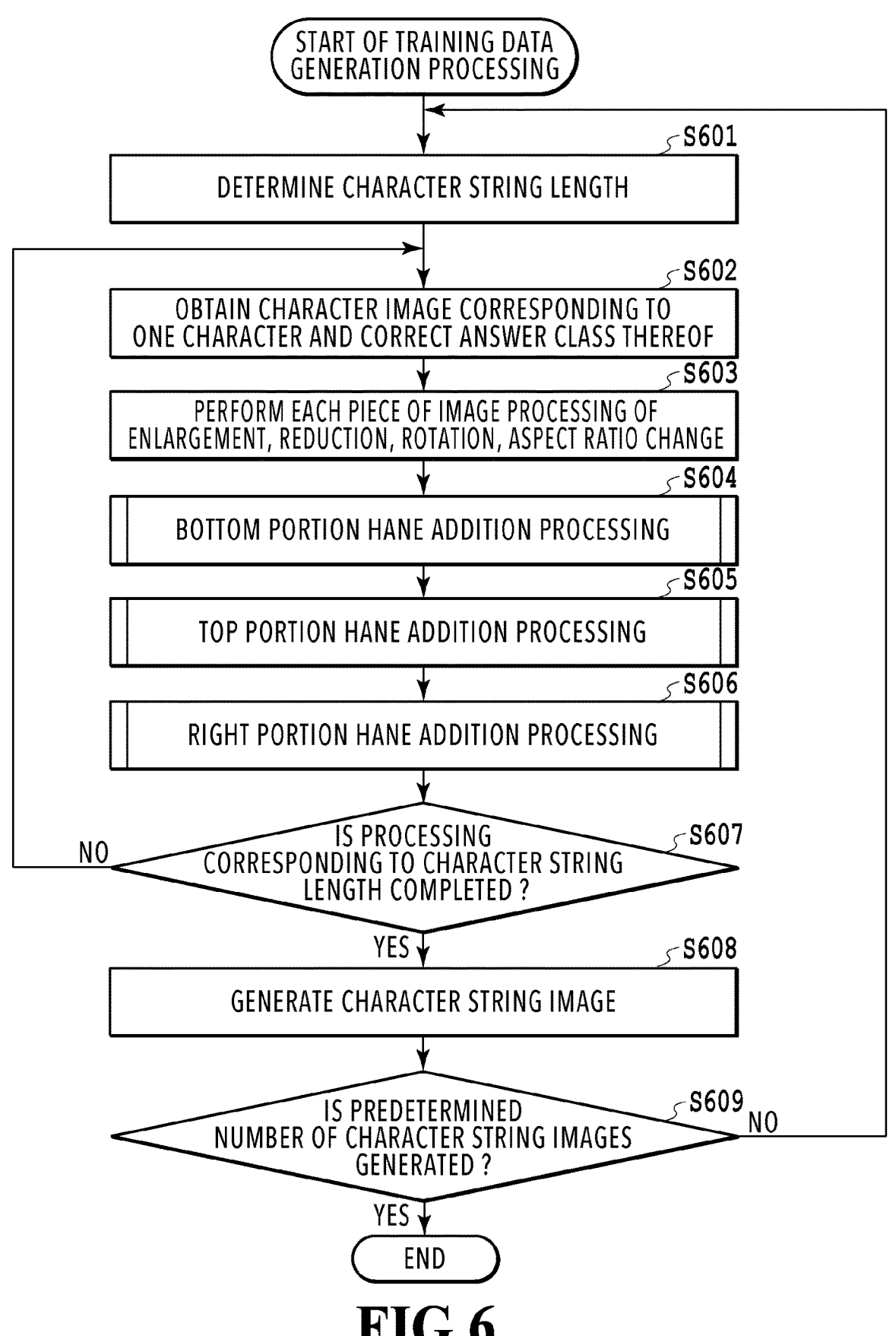
FIG. 6 is a flowchart showing a flow of training data generation processing.

Following the above, the training data generation processing by the training data generation unit 101 is explained by using FIG. 6. FIG. 6 is a flowchart showing a rough flow of the training data generation processing. Each step shown in the flowchart in FIG. 6 is implemented by the CPU 201 loading a predetermined program stored in the ROM 202 or the like onto the RAM 204 and executing the program. The training data generation processing is started in response to a predetermined user operation via the input device 206 of the image processing apparatus 100, or triggered by a predetermined input signal received from the terminal device 110 or the like via the network 120. In the following explanation, symbol "S" means a step.

At S601, which character image including how many characters is used to generate a training image is determined randomly. At this time, although the minimum character string length is, for example, "1" and the maximum character length is, for example, "15", it is possible to set any value for both.

At S602, from the character image DB (for example, the above-described table 300), a pair of the character image corresponding to one character and the correct answer class thereof is obtained randomly. The character image that is obtained here is a physically collected character image before the deformation processing is performed. What is required is to obtain a pair of a character image and a correct answer class, which does not cause any variation in training data that is generated, and it may also be possible to impose some restrictions on the obtaining target by, such as changing the correct answer class in order.

At S603, the deformation processing is performed for the character image obtained at S602. Specifically, at a scale selected randomly within a predetermined range, enlargement/reduction or expansion/contraction processing is performed. Further, similarly, with an angle selected randomly within a predetermined range, rotation processing is performed, and in a ratio selected randomly within a predetermined range, aspect ratio change processing is performed.

Figures 7A, 7B, 7C:
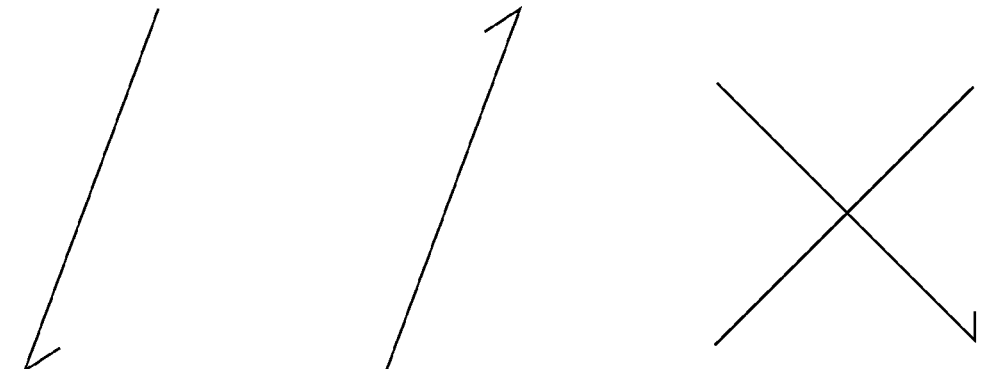
FIG. 7A to FIG. 7C are each a diagram showing an example of a hane that is added.

At S604, for the character image for which the deformation processing has been performed, the bottom portion hane addition processing is performed. FIG. 7A shows an example of a hane (extra segment) that is added by the processing at this step. A short line extending in the upper-rightward direction from the bottom end portion of a long straight line represents the hane that is added. The hane such as this is unlikely to occur in a case where a single character is written, but the possibility of the occurrence of the hane such as this becomes stronger in a case where a plurality of characters is written in the rightward direction quickly and continuously. The locus such as this occurs in a case where the writer starts the movement to the writing start point of the next character, which is located in the upper-rightward direction, before the pen point separates from the paper, or the like. Details of the bottom portion hane addition processing will be described later.

At S605, for the character image for which the bottom portion hane addition processing has been completed, the top portion hane addition processing is performed. FIG. 7B shows an example of a hane (extra segment) that is added by the processing at this step. A short line extending in the lower-leftward direction from the top end portion of a long straight line represents the hane that is added. The locus such as this is unlikely to occur in a case where a single character is written, but the possibility of the occurrence of the locus such as this becomes stronger in a case where characters are written in the rightward direction quickly and continuously. The locus such as this occurs in a case where the pen point is in contact with paper before the original writing start point is reached at the time of a writer landing on the original writing start point while quickly moving the pen from left to right. To be strict, this is pre-writing accompanying the landing, rather than a bane, but in the present specification, the handwriting partially protruding from the main handwriting of a character is also described as a "hane". In FIG. 7B, the hane extends in the lower-leftward direction, but there may be a case where the hane extends in the upper-leftward direction. The direction of the hane depends on the position of the pen point of the pen of the writer immediately before the start of writing and the position also depends on the kind of previous character. For example, in a case where the previous character is the figure "8" whose writing is completed at the top right, at the writing start position of the next character, the hand is likely to exist on the upper side, and therefore, the hane in the upper-leftward direction is likely to occur. On the other hand, in a case where the previous character is the figure "1" whose writing is completed at the bottom, at the writing start point of the next character is likely to exist on the lower side, and therefore, the hane in the lower-leftward direction is likely to occur. Details of the top portion hane addition processing will be described later.

At S606, for the character image for which the top portion hane addition processing has been performed, the right portion hane addition processing is performed. FIG. 7C shows an example of the hane (extra segment) that is added by the processing at this step. The line extending in the upward direction from the bottom-right end portion of the straight line extending from the top left toward the bottom right of the two long straight lines intersecting with each other represents the hane that is added. The hane such as this is likely to occur in a case where a character or symbol consisting of intersecting lines. Details of the right portion hane addition processing will be described later. Then, the resultant image for which the right portion hane addition processing has been performed (that is, the image obtained by performing the deformation processing and the three kinds of hane addition processing for the character image selected randomly) is stored in the RAM 204 as a hane-added image.

At S607, whether or not the processing corresponding to the character string length determined at S601 is completed is determined. In a case where the processing corresponding to the determined character string length is completed, the processing advances to S608 and in the other case, the processing returns to S602 and the processing is continued.

At S608, a character string image obtained by combining the hane-added images corresponding to the plurality of characters generated in the processing so far is generated. As a specific combination method, for example, by arranging the deformed character images from left to right in the order of generation and connecting them, a character string image is generated. Further, the correct answer classes of the character images, which are used as the base of the hane-added images, are arranged from left to right in the same order and are taken as the correct answer class corresponding to the generated character string image. The character string image and the correct answer class, which are thus obtained, and associated with each other and registered in the training image DB (in the present embodiment, the table 400 described previously) within the storage 205 as the training data, which is a pair of the training image and the correct answer class.

At S609, whether or not to terminate the training data generation processing is determined. The termination condition here is a case where the generation of a predetermined number of character string images is completed and the like. In a case where the termination condition is not satisfied, the processing returns to S601 and the processing is continued. In a case where the termination condition is satisfied, the training data generation processing is terminated.

The above is rough contents of the training data generation processing. In the flowchart in FIG. 6, for each pattern of the bottom portion, the top portion, and the right portion, the hane addition processing is performed, but the pattern of the hane that is added is not limited to those. For example, it may also be possible to further add the hane in another pattern, such as the left portion pattern, or to add only the hanes at the bottom portion and the top portion.

<<Details of Bottom Portion Hane Addition Processing>>

Figure 8:
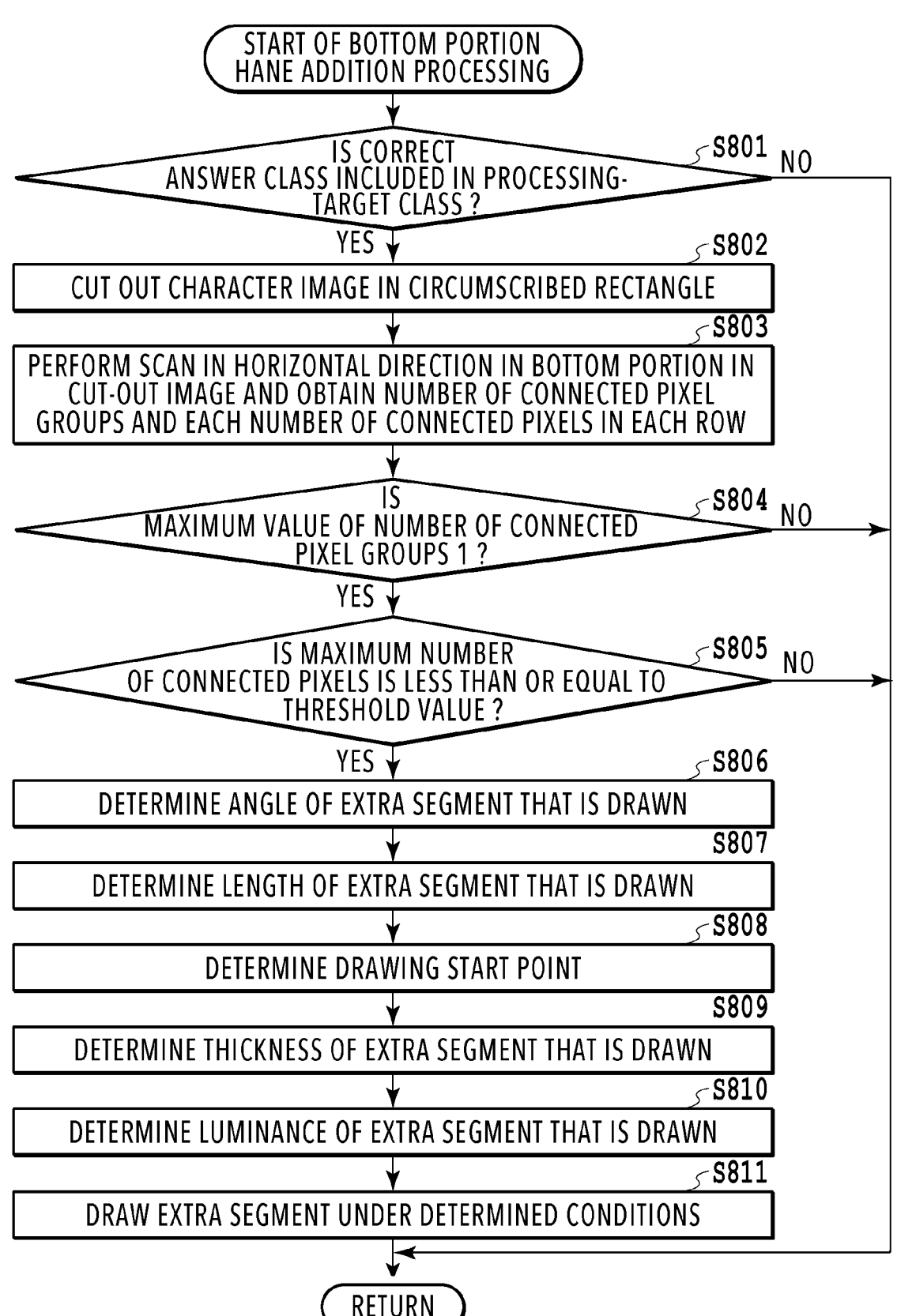
FIG. 8 is a flowchart showing details of bottom portion hane addition processing.

FIG. 8 is a flowchart showing details of the bottom portion bane addition processing. In the following, explanation is given along the flowchart in FIG. 8.

At S801, whether or not the correct answer class obtained at S602 along with the character image is included in the range of the processing-target class defined in advance is determined. Here, it is assumed that the figures 0 to 9 are set as the processing-target class range. In a case where determination results indicate inclusion, the processing advances to S802 and in the other case, this processing is exited.

At S802, for the character image obtained at S602, processing to cut out the character image in a circumscribed rectangle is performed. The cut-out image (that is, the image obtained by deleting the margin portion of the character image) is stored in the RAM 204 as the cut-out image.

S803 to S805 that follow are processing for detecting a line segment that may cause a hane to occur by handwriting. Specifically, based on the number of connected pixel groups for each row and the number of connected pixels in each connected pixel group, which are obtained in an area accounting for a predetermined percentage in the bottom portion in the cut-out image, a line segment is specified, which is taken as the addition target of an extra segment simulating a bane. In the following, detailed explanation is given.

At S803, in an area accounting for a predetermined percentage (for example, the area accounting for twenty percent from the bottom end) in the bottom portion in the cut-out image, the number of connected pixel groups for each row and the number of connected pixels in each connected pixel group are obtained. Here, the connected pixel group for each row means a black pixel group (set of pixels whose luminance value is less than or equal to a threshold value) existing continuously in the direction horizontal with respect to the erect direction of a handwritten character. The number of connected pixels is the number of black pixels constituting the connected pixel group. Further, the number of rows is arbitrary. FIG. 9 shows an example of the number of connected pixel groups and the number of connected pixels, which are obtained from the cut-out image. In the example in FIG. 9, for each of four cut-out images 901 to 904, the numbers of connected pixel groups and the numbers of connected pixels corresponding to three rows indicated by dotted-line arrows are shown. In a case of a line whose bottom portion is simple, like the cut-out image 901, the number of connected pixel groups is one in each row. On the other hand, in a case where there is a bend as in the cut-out image 902, the number of connected pixel groups may become two or more. The cut-out image such as this is excluded from the target to which a hane is added by the processing at S804, to be described later. Further, in a case where there is a line segment extending in the horizontal direction at the bottom portion as in the cut-out image 903 or in a case where the line segment at the bottom portion is curved as in the cut-out image 904, the number of connected pixels is large. The cut-out image such as this is also excluded from the target to which a hane is added by the processing at S805, to be described later.

At S804, the processing is branched in accordance with whether or not the maximum value of the number of connected pixel groups for each row obtained at S803 is 1. In a case where the maximum value of the number of connected pixel groups is "1", the processing advances to S805 and in a case where the number is other than "1", this processing is exited. As described previously, in a case where the line segment at the bottom portion of a character is bent as in the cut-out image 902, the processing is terminated.

At S805, the number of connected pixels is checked for all the connected pixel groups for each row obtained at S803 and the processing is branched in accordance with whether or not the maximum number of connected pixels is less than or equal to a threshold value that is set in advance. In a case where the maximum number of connected pixels is less than or equal to the threshold value that is set in advance, the processing advances to S806 and in a case where the number exceeds the threshold value, this processing is exited. As described previously, in a case where there is a line segment extending in the horizontal direction at the bottom portion as in the cut-out image 903 or in a case where the line segment at the bottom portion is curved as in the cut-out image 904, the processing is terminated. At subsequent S806 to S810, hane drawing conditions are determined.

At S806, the angle of a hane (extra segment) that is drawn is determined. Specifically, a random angle is selected within a predetermined range in the upper-rightward direction and the angle is taken as the angle of the hane that is drawn. An example of the predetermined range is a range of 15° to 60° in a case where the angle in the exactly rightward direction is taken to be 0° and the angle in the exactly upward direction is taken to be 90°.

At S807, the length of the hane (extra segment) that is drawn is determined. Specifically, a random length is selected within a predetermined range with the height of the cut-out image being taken as a reference and the length is taken as the length of the hane that is drawn. An example of the predetermined range is a range of 1% to 10% of the height of the cut-out image. In a case where the length of the hane is tool great, the risk of erroneous recognition as another character is increased, and therefore, attention should be paid. For example, in a case where a hane in the upper-rightward direction with an angle of 15°, which is too long, is added to the bottom portion of the figure "7", there is a possibility that the character shape of the original "7" changes into a character shape that may be read erroneously as "2" depending on the character shape of "7". The deformed image such as this adversely affects the recognition accuracy of "2" in particular.

At S808, the start position of the hane (extra segment) that is drawn is determined. Specifically, the center position of the connected pixel group in the lowermost row in the cut-out image is taken to be the drawing start point of the hane that is drawn.

At S809, the thickness of the hane (extra segment) that is drawn is determined. Specifically, the number of connected pixels of the connected pixel group in a row several rows above the bottom of the cut-out image is taken to be the thickness of the hane that is drawn. Here, the reason the row several rows above the lowermost row is selected instead of the lowermost row is that in a case of the lowermost row, there is a possibility that the tip of the bottom end portion tapers off in a microscopic view and the number of connected pixels is extremely small.

At S810, the luminance of the bane (extra segment) that is drawn is determined. Specifically, the average luminance of the pixel within the connected pixel group in a row several rows above the bottom of the cut-out image is taken to be the luminance of the hane that is drawn. The reason the row several rows above the lowermost row is selected instead of the lowermost row is that in a case of the lowermost row, there is a possibility that the tip of the bottom end portion tapers off or becomes blurred in a microscopic view and the tint becomes extremely pale.

At S811, based on the drawing conditions determined at S806 to S810, drawing processing to add a bane to the bottom end portion of the line segment located at the bottom portion of the processing-target deformed character image is performed. The image in which the hane has been added by this drawing processing is stored in the RAM 204.

The above is the contents of the bottom portion hane addition processing. In order to more simulate a real hane, for example, it may also be possible to draw the hane so that the luminance becomes paler toward the tip of the hane, draw the hane so that the thickness becomes less toward the tip, and so on.

<<Details of Top Portion Hane Addition Processing>>

FIG. 10 is a flowchart showing details of the top portion hane addition processing. In the following, explanation is given along the flowchart in FIG. 10. Explanation is given by omitting or simplifying the explanation of the contents common to those of the bottom portion bane addition processing shown in FIG. 8.

S1001 and S1002 are the same as S801 and S802 in the bottom portion hane addition processing. First, whether or not the correct answer class obtained at S602 along with the character image is included in the range of the processing-target class defined in advance is determined (S1001). As at S801, it is assumed that the figures 0 to 9 are set as the range of the processing-target class. Then, in a case where the correct answer class is included, the processing to cut out the character image obtained at S602 in a circumscribed rectangle is performed (S1002).

S1003 to S1005 that follow are processing for detecting a line segment that may cause a hane to occur by handwriting. Specifically, based on the number of connected pixel groups for each row and the number of connected pixels in each connected pixel group, which are obtained in an area accounting for a predetermined percentage in the top portion in the cut-out image, a line segment is specified, which is taken as the addition target of an extra segment simulating a hane. In the following, detailed explanation is given.

At S1003 in an area accounting for a predetermined percentage (for example, the area accounting for twenty percent from the top end) in the top portion in the cut-out image, the number of connected pixel groups for each row and the number of connected pixels in each connected pixel group are obtained. The meaning of the "number of connected pixel groups for each row" and the "number of connected pixels" is the same as that explained at S803. Further, as at S803, the number of rows is arbitrary.

S1004 and S1005 are the same as S804 and S805 in the bottom portion hane addition processing. That is, in a case where the maximum value of the number of connected pixel groups for each row is "1" (YES at S1004) and the maximum number of connected pixels in each connected pixel group for each row is less than or equal to a threshold value that is set in advance (YES at S1005), the processing advances to processing to determine hane drawing conditions at S1006 and subsequent steps.

At S1006, the angle of a hane (extra segment) that is drawn is determined. Specifically, a random angle is selected within a predetermined range in the leftward direction and the angle is taken as the angle of the hane that is drawn. An example of the predetermined range is a range of 135° to 225° in a case where the angle in the exactly rightward direction is taken to be 0° and the angle in the exactly upward direction is taken to be 90°.

At S1007, the length of the bane (extra segment) that is drawn is determined. Specifically, a random length is selected within a predetermined range with the height of the cut-out image being taken as a reference and the length is taken as the length of the hane that is drawn. An example of the predetermined range is a range of 1% to 10% of the height of the cut-out image. In a case where the length of the hane is tool great, the risk of erroneous recognition as another character is increased, and therefore, attention should be paid. For example, in a case where a bane in the leftward direction, which is too long, is added to the top portion of the figure "1", there is a possibility that the character shape of the original "1" changes into a character shape that may be read erroneously as "7" depending on the character shape of "1". The deformed image such as this adversely affects the recognition accuracy of "7" in particular.

At S1008, the start position of the bane (extra segment) that is drawn is determined. Specifically, the center position of the connected pixel group in the uppermost row in the cut-out image is taken to be the drawing start point of the hane that is drawn.

At S1009, the thickness of the bane (extra segment) that is drawn is determined. Specifically, the number of connected pixels of the connected pixel group in a row several rows under the top of the cut-out image is taken to be the thickness of the hane that is drawn. Here, the reason the row several rows under the uppermost row is checked instead of the uppermost row is that in a case of the uppermost row, there is a possibility that the tip of the top end portion tapers off in a microscopic view and the number of connected pixels is extremely small.

At S1010, the luminance of the hane (extra segment) that is drawn is determined. Specifically, the average luminance of the pixel within the connected pixel group in a row several rows under the top of the cut-out image is taken to be the luminance of the hane that is drawn. The reason the row several rows under the uppermost row is checked instead of the uppermost row is that in a case of the uppermost row, there is a possibility that the tip of the top end portion tapers off or becomes blurred in a microscopic view and the tint becomes extremely pale.

At S1011, based on the drawing conditions determined at S1006 to S1010, drawing processing to add a hane to the top end portion of the line segment located at the top portion of the processing-target deformed character image is performed. The image in which the hane has been added by this drawing processing is stored in the RAM 204.

The above is the contents of the top portion hane addition processing. In order to more simulate a real hane, for example, it may also be possible to draw the hane so that the luminance becomes paler toward the tip of the hane, draw the hane so that the thickness becomes less toward the tip, and so on, and this is the same as in the bottom portion hane addition processing.

<<Details of Right Portion Hane Addition Processing>>

Figure 11:
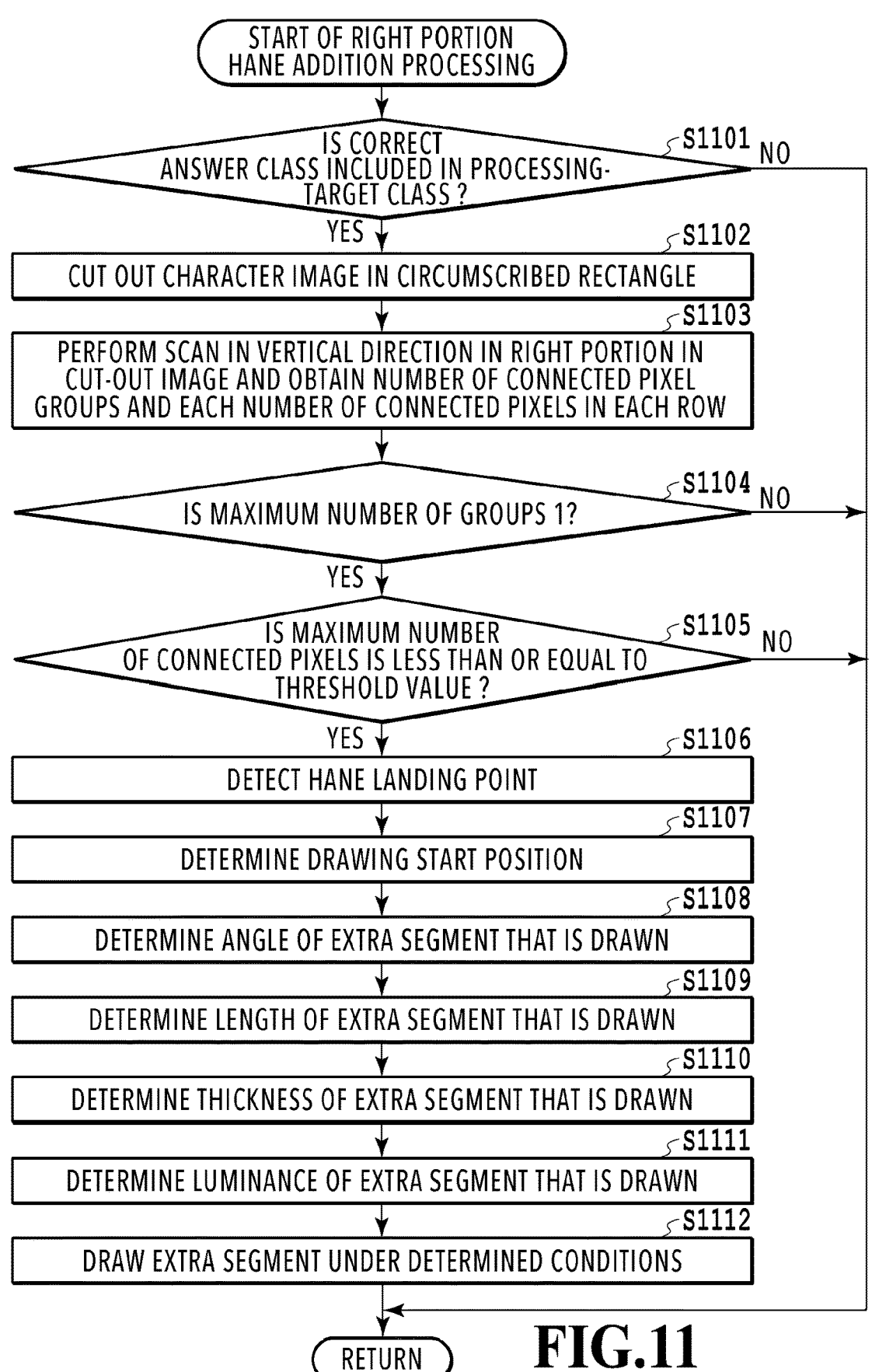
FIG. 11 is a flowchart showing details of right portion hane addition processing.

FIG. 11 is a flowchart showing details of the right portion hane addition processing. In the following, explanation is given along the flowchart in FIG. 11. Explanation is given by omitting or simplifying the explanation of the contents common to those of the bottom portion hane addition processing shown in FIG. 8

At S1101, whether or not the correct answer class obtained at S602 along with the character image is included in the range of the processing-target class defined in advance is determined. Here, it is assumed that alphabet letters, such as the uppercase "X" and the lowercase "x", are set in advance as the processing-target class range. In a case where determination results indicate inclusion, processing to cut out the character image obtained at S602 in a circumscribed rectangle is performed (S1102).

S1102 is the same as S802 in the bottom part hane addition processing. That is, processing to cut out the character image obtained at S602 in a circumscribed rectangle is performed.

S1103 to S1105 that follow are processing for detecting a line segment that may cause a hane to occur by handwriting. Specifically, based on the number of connected pixel groups for each row and the number of connected pixels in each connected pixel group, which are obtained in an area accounting for a predetermined percentage in the right portion in the cut-out image, a line segment is specified, which is taken as the addition target of an extra segment simulating a hane. In the following, detailed explanation is given.

Figure 12A:
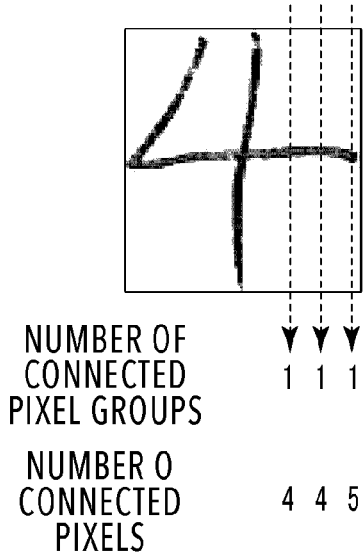
FIG. 12A is a diagram showing an example of a number of connected pixel groups and a number of connected pixels and FIG. 12B and FIG. 12C are each a diagram showing an example in a case of not being a target of right portion hane addition processing.
Figure 12B:
Figure 12C:
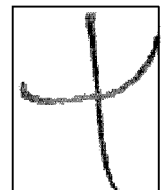
Figure 13:
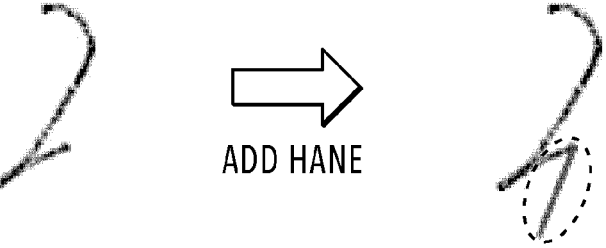
FIG. 13 is a diagram showing an example in a case where an inappropriate hane is added.

At S1103, in an area accounting for a predetermined percentage (for example, the area accounting for ten percent from the right end) in the right portion in the cut-out image, the number of connected pixel groups for each column and the number of connected pixels in each connected pixel group are obtained. Here, the connected pixel group for each column means a black pixel group (set of pixels whose luminance value is less than or equal to a threshold value) existing continuously in the direction vertical with respect to the erect direction of a handwritten character. The number of connected pixels is the number of black pixels constituting the connected pixel group. Further, the number of columns is arbitrary. FIG. 12A is a diagram showing an example of the number of connected pixel groups and the number of connected pixels, which are obtained from the cut-out image. In the example in FIG. 12A, for a cut-out image of the figure "4", the numbers of connected pixel groups and the numbers of connected pixels corresponding to three columns indicated by dotted-line arrows are shown. For the simple line segment extending in the horizontal direction as shown schematically, the number of connected pixel groups is one in each column. On the other hand, in a case where the character shape is distorted and the top portion of a vertical line protrudes considerably rightward (FIG. 12B), in a case where the right portion of a character bends (FIG. 12C), or the like, the number of connected pixel groups becomes two or more, the number of connected pixels becomes large, and so on. The cut-out image such as this is excluded from the target to which a hane is added by the processing at S1104 or S1105, to be described later.

At S1104, the processing is branched in accordance with whether or not the maximum value of the number of connected pixel groups for each column obtained at S1103 is 1. In a case where the maximum value of the number of connected pixel groups is "1", the processing advances to S1105 and in a case where the number is other than "1", this processing is exited.

At S1105, the number of connected pixels is checked for all the connected pixel groups for each column obtained at S1103 and the processing is branched in accordance with whether or not the maximum number of connected pixels is less than or equal to a threshold value that is set in advance. In a case where the maximum number of connected pixels is less than or equal to the threshold value that is set in advance, the processing advances to S1106 and in a case where the number exceeds the threshold value, this processing is exited. At subsequent S1106 to S1111, hane drawing conditions are determined.

At S1106, the landing point (the writing start point of the next point or segment constituting a character in a case where a hane has occurred) of the hane that is drawn is detected. Specifically, by performing the processing equivalent to that at S802 to S805 and S808, the position of the top end point of a single vertical line extending toward the top portion of the image is detected. The detection method of the hane landing point is not limited to this method.

At S1107, the start position of the hane (extra segment) that is drawn is determined. Specifically, the center position of the connected pixel group in the rightmost column in the cut-out image is taken to be the thawing start point of the hane that is drawn.

At S1108, the angle of the hane (extra segment) that is drawn is determined. Specifically, the angle formed by the drawing start point determined at S1107 and the landing point determined at S1106 is calculated and is taken as the angle of the hane that is drawn.

At S1109, the length of the hane (extra segment) that is drawn is determined. Specifically, a random length is selected in a range in which the distance between the two points, the is, the drawing start point determined at S1107 and the landing point determined at S1106, is not exceeded, and is taken as the length of the hane that is drawn.

At S1110, the thickness of the hane (extra segment) that is drawn is determined. Specifically, the number of connected pixels of the connected pixel group in a column several columns to the left from the right of the cut-out image is taken to be the thickness of the hane that is drawn. Here, the reason the column several columns to the left from the rightmost column is checked instead of the rightmost column is that in a case of the rightmost column, there is a possibility that the tip of the right end portion tapers off in a microscopic view and the number of connected pixels is extremely small.

At S1111, the luminance of the hane (extra segment) that is drawn is determined. Specifically, the average luminance of the pixel within the connected pixel group in a column several columns to the left from the right of the cut-out image is taken to be the luminance of the hane that is drawn. The reason the column several columns to the left from the rightmost column is checked instead of the rightmost column is that in a case of the rightmost column, there is a possibility that the tip of the right end portion tapers off or becomes blurred in a microscopic view and the tint becomes extremely pale.

At S1112, based on the drawing conditions determined at S1107 to S1111, drawing processing to add a hane to the right end portion of the line segment located at the right portion of the processing-target deformed character image is performed. The image in which the hane has been added by this drawing processing is stored in the RAM 204.

The above is the contents of the right portion hane addition processing. In order to more simulate a real hane, for example, it may also be possible to draw the hane so that the luminance becomes paler toward the tip of the hane, draw the hane so that the thickness becomes less toward the tip, and so on, and this is the same as in the bottom portion hane addition processing and the top portion hane addition processing.

Further, it may also be possible to adjust the hane addition rate (number of times of addition) based on the final character recognition accuracy and the trend of erroneous recognition. Specifically, it may also be possible to perform the top portion, bottom portion, and right portion hane addition processing, respectively, with a predetermined probability and perform the hane addition processing more frequently for a pattern that is more likely to cause an error so that the pattern appears in the training data most frequently. Further, it may also be possible to change the predetermined probability in accordance with the position in the character string. For example, for the character arranged at the rightmost end in the character string, the top portion hane and the bottom portion hane are unlikely to occur. Based on the thinking such as this, for the character arranged at the rightmost end, it may also be possible to set the addition rate of the top portion hane and the bottom portion hane to 0% and perform only the right portion hane addition processing with a predetermined probability. By the adjustment such as this, it is possible to further improve the character recognition accuracy.

As above, according to the present embodiment, it is possible to generate training images that reproduce a variety of ways a hane occurs, which is likely to occur actually in a physically collected character images and whose adverse influence is small. Due to this, it is possible to improve the character recognition accuracy in a case where there is a hane in an input character image.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, it is made possible to generate a training image in accordance with the way a hane occurs, which is found in actual handwriting. As a result of that, it is possible to obtain a trained model for the handwritten character OCR, which improves the character recognition accuracy for an image including a handwritten character with a hane while suppressing a reduction in the character recognition accuracy for an image including a handwritten character with no hanes.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-100216, filed Jun. 16, 2021 which is hereby incorporated by reference wherein in its entirety.

What is claimed is:

1. An image processing apparatus comprising:
a memory that stores a program; and
a processor that executes the program to perform:
obtaining a character image representing a handwritten character;
detecting a line segment at which an extra segment may occur in handwriting among line segments constituting the handwritten character in the character image;
adding a simulated extra segment to the end portion of the detected line segment; and
generating training data for machine learning by associating the character image in which the simulated extra segment has been added and a correct answer class with each other;
performing the machine learning by using the generated training data and generating a trained model; and
outputting text information by inputting a target image to the trained model,
wherein the adding is performed by randomly determining a length of the simulated extra segment.

2. The image processing apparatus according to claim 1, wherein
in the detecting:
in an area accounting for a predetermined percentage in the bottom portion in the character image, a number of connected pixel groups for each row and a number of connected pixels in each connected pixel group are obtained; and
in a case where the maximum value of the number of connected pixel groups for each row is 1 and the maximum number of connected pixels in each connected pixel group is less than or equal to a threshold value, a line segment existing in the area is detected as the line segment at which the extra segment may occur,
in the adding, the simulated extra segment is added to the bottom end portion of the detected line segment,
the connected pixel group for each row represents a black pixel group existing continuously in a direction horizontal with respect to an erect direction of the handwritten character, and
the number of connected pixels represents a number of black pixels constituting the connected pixel group.

3. The image processing apparatus according to claim 1, wherein
in the detecting:
in an area accounting for a predetermined percentage in the top portion in the character image, a number of connected pixel groups for each row and a number of connected pixels in each connected pixel group are obtained; and
in a case where the maximum value of the number of connected pixel groups for each row is 1 and the maximum number of connected pixels in each connected pixel group is less than or equal to a threshold value, a line segment existing in the area is detected as the line segment at which the extra segment may occur,
in the adding, the simulated extra segment is added to the top end portion of the detected line segment,
the connected pixel group for each row represents a black pixel group existing continuously in a direction horizontal with respect to an erect direction of the handwritten character, and
the number of connected pixels represents a number of black pixels constituting the connected pixel group.

4. The image processing apparatus according to claim 1, wherein
in the detecting:
in an area accounting for a predetermined percentage in the right portion in the character image, a number of connected pixel groups for each column and a number of connected pixels in each connected pixel group are obtained; and
in a case where the maximum value of the number of connected pixel groups for each column is 1 and the maximum number of connected pixels in each connected pixel group is less than or equal to a threshold value, a line segment existing in the area is detected as the line segment at which the extra segment may occur,
in the adding, the simulated extra segment is added to the right end portion of the detected line segment,
the connected pixel group for each column represents a black pixel group existing continuously in a direction vertical with respect to an erect direction of the handwritten character, and
the number of connected pixels represents a number of black pixels constituting the connected pixel group.

5. The image processing apparatus according to claim 1, wherein
the length is determined in a range of 1% to 10% of a height of the cut-out image in a case where the height is taken to be a reference.

6. The image processing apparatus according to claim 1, wherein
the processor executes the program to perform:
deformation processing for the obtained character image; and
the detecting is performed by taking a deformed character image as a target.

7. The image processing apparatus according to claim 1, wherein
the processor executes the program to perform:
the machine learning by using the generated training data.

8. The image processing apparatus according to claim 1, wherein
the adding is performed by randomly determining an angle of the simulated extra segment.

9. The image processing apparatus according to claim 2, wherein the adding is performed by randomly determining an angle of the simulated extra segment.

10. The image processing apparatus according to claim 3, wherein the adding is performed by randomly determining an angle of the simulated extra segment.

11. The image processing apparatus according to claim 4, wherein the adding is performed by specifying a landing point and a drawing start point of the simulated extra segment and determining an angle of the simulated extra segment based on the specified landing point and the specified drawing start point.

12. The image processing apparatus according to claim 6, wherein the deformation processing includes one of rotation, enlargement or reduction, expansion or contraction, and aspect ratio change.

13. The image processing apparatus according to claim 9, wherein the angle is determined in a range of 15° to 60° in a case where the angle in the exactly rightward direction is taken to be 0° and the angle in the exactly upward direction is taken to be 90° in the character image.

14. The image processing apparatus according to claim 10, wherein the angle is determined in a range of 135° to 225° in a case where the angle in the exactly rightward direction is taken to be 0° and the angle in the exactly upward direction is taken to be 90° in the character image.

15. The image processing apparatus according to claim 11, wherein in the adding, an angle formed by the specified landing point and the specified drawing start point is determined to be an angle of the simulated extra segment.

16. The image processing apparatus according to claim 11, wherein the adding is performed by determining a length of the simulated extra segment as a random length in a range in which a distance between two points of the specified drawing start point and the specified landing point is not exceeded.

17. An image processing method comprising the steps of:

obtaining a character image representing a handwritten character;

detecting a line segment at which an extra segment may occur in handwriting among line segments constituting the handwritten character in the character image;

adding a simulated extra segment to the end portion of the detected line segment; and generating training data for machine learning by associating the character image in which the simulated extra segment has been added and a correct answer class with each other;

performing the machine learning by using the generated training data and generating a trained model; and outputting text information by inputting a target image to the trained model, wherein the adding is performed by randomly determining a length of the simulated extra segment.

18. A non-transitory computer readable storage medium storing a program for causing a computer to perform an image processing method comprising the steps of:

obtaining a character image representing a handwritten character;

detecting a line segment at which an extra segment may occur in handwriting among line segments constituting the handwritten character in the character image;

adding a simulated extra segment to the end portion of the detected line segment; and generating training data for machine learning by associating the character image in which the simulated extra segment has been added and a correct answer class with each other;

performing the machine learning by using the generated training data and generating a trained model; and outputting text information by inputting a target image to the trained model, wherein the adding is performed by randomly determining a length of the simulated extra segment.

* * * * *